Aug. 31, 1965

N. R. HENRY 3,203,397

POULTRY FEEDER

Filed Nov. 21, 1963

INVENTOR.
*NELSON R. HENRY*

BY *Newton, Hopkins & Jones*
*Attorneys*

Aug. 31, 1965  N. R. HENRY  3,203,397
POULTRY FEEDER

Filed Nov. 21, 1963  2 Sheets-Sheet 2

INVENTOR.
NELSON R. HENRY
BY
Newton, Hopkins & Jones
Attorneys

United States Patent Office 3,203,397
Patented Aug. 31, 1965

3,203,397
POULTRY FEEDER
Nelson R. Henry, 583 Willivee Drive, Decatur, Ga.
Filed Nov. 21, 1963, Ser. No. 325,351
2 Claims. (Cl. 119—53)

This invention relates to a feeder and is more particularly concerned with a poultry feeder of the type having an adjustable tubular bin which will regulate the amount of feed, fed from the bin to a feeding trough.

In the past poultry feeders have been used extensively for supplying feed to a given level in a trough. The prior art feeders of the general type here disclosed include a cup shaped cylindrical trough which is adjustably suspended in spaced relationship beneath the bottom of a tubular bin, the wall of the trough extending above the bottom of the tubular bin. A plurality of short sections of chain are employed for suspending the trough from the bottom portion of the bin, each chain section having a hook by which the position of the chain may be adjusted with respect to the bin. These hooks, however, are difficult to remove and attach to the bin. The bin, in turn, is suspended by a cable or chain from an overhead support.

Because of the flexible nature of the chain by which the trough is suspended from the bin, it is impractical to support the prior art feeder from the floor since the lower end portion of the bin would rest on the trough and, thereby, prevent the feed from passing outwardly from the bin into the trough where it is accessible to the poultry.

Briefly described, the present invention, which obviates the difficulties described above, includes a cup shaped trough having an upstanding cylindrical wall and a concentrically located smaller open ended, tubular bin, the bottom portion of which is received within the trough. A plurality of rigid, spring loaded, spacer members are carried by the trough and adjustably engage the bin so as to maintain the bottom of the bin in space relationship to the bottom of the trough, regardless of whether the feeder is suspended by a cable from an overhead support or is resting upon the floor or the ground.

Accordingly, it is the object of the present invention to provide a feeder which is inexpensive to manufacture, durable in structure, and efficient in operation.

Another object of the present invention is to provide a feeder in which the relative position of the trough and bin may be adjusted quickly and easily.

Another object of the present invention is to provide a feeder of the type here described which is suitable for either suspending from an overhead support or supporting from the floor or the ground.

Another object of the present invention is to provide, in a poultry feeder an inexpensive and efficient mechanism for adjusting the relative height of the bin with respect to the trough.

Other objects, features, and advantages of the present invention will become apparent from the following description when taken in conjunction with the accompanying drawings wherein like characters of reference designate corresponding parts throughout the several views, and wherein.

Figure 1:
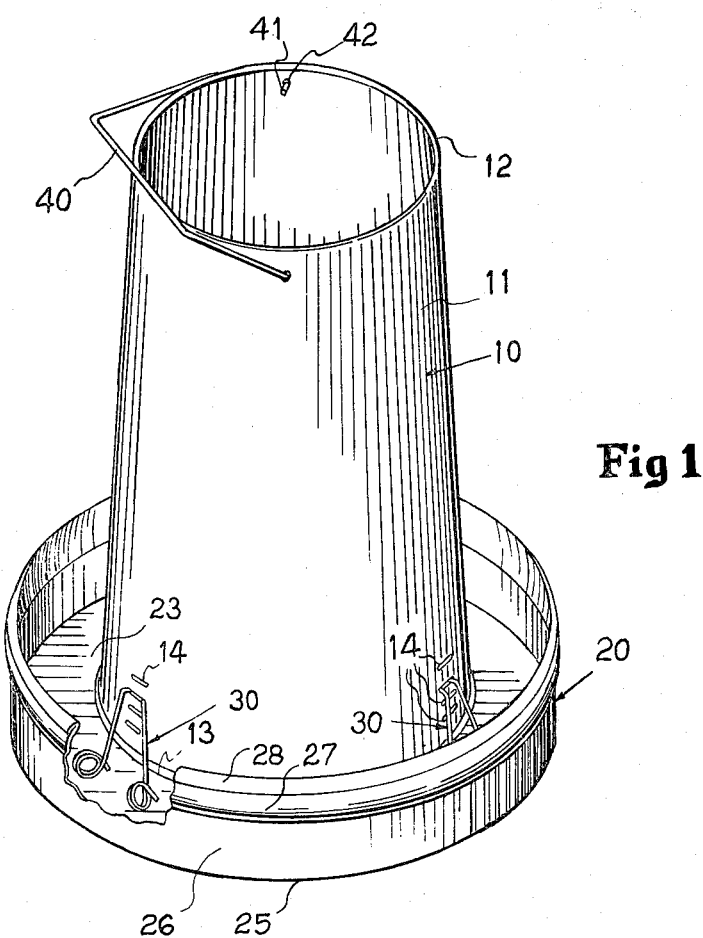
FIG. 1 is a prospective view of a feeder constructed in accordance with the present invention, a portion of the feeder being broken away to illustrate the details thereof.

Referring now in detail to the embodiment chosen for the purpose of illustrating the present invention, it being understood that, in its broader aspects, the present invention is not limited to the exact details herein depicted, numeral 10 denotes generally an open ended, tubular bin, which, in the present embodiment, is a frusto-conical member having an upward tapered side wall 11 which terminates in an inwardly curled upper end 12 and an outwardly curled lower end 13.

Adjacent to the lower end 13, the wall 11 is provided with a plurality of groups of vertical spaced circumferential elongated slots 14. The three groups of slots 14 here illustrated are circumferentially spaced from each other by 120°, even though it will be understood by those skilled in the art that the number of groups of slots 14 may be varied, as desired. Each group of slots 14 is provided with an equal number of slots 14 which are respectively spaced from the bottom 13 by distances corresponding to the spacing of the similar slots 14 in the other groups. In other words, the bottommost slot 14 in each group is spaced from bottom 13 by an equal amount and, in like manner, the slots 14 thereabove in each group are spaced from the bottom 13 in equal amounts.

For cooperating with bin 10, there is a cylindrical cup shaped trough denoted generally by numeral 20. The trough 20 includes a conical central bottom portion 21 which tapers outwardly and downwardly in all directions from an apex 22, the central conical bottom portion 21 being of the same or essentially the same diameter as the bottom 13 of the bin 10.

Integrally joined to the peripheral edge of the central bottom portion 21 is a flat, annular, outer bottom plate 23, the inner periphery or edge of which is joined to the peripheral edge of central bottom portion 21, as indicated at numeral 24, thereby defining a common circular edge between the central body portion 21 and the outer bottom plate 23. The outer edge or periphery 25 of the outer bottom plate 23 is turned upwardly to define an essentially upright cylindrical wall 26 which terminates in a semitoroidal, outwardly convexed rim member 27, the rim member 27 having its upper edge 28 turned outwardly against the outer surface of rim 27.

Figure 4:
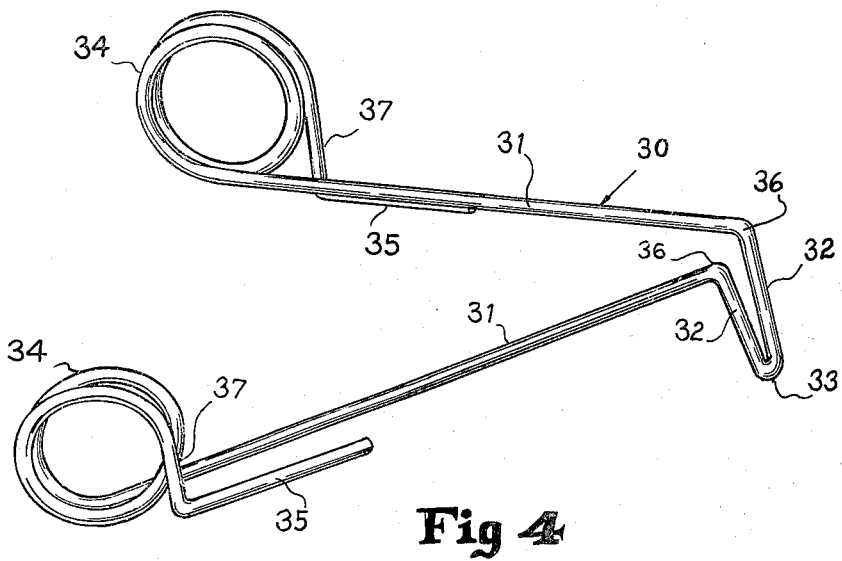
FIG. 4 is an enlarged perspective view of one of the spacer members utilized in the feeder of the present invention.

According to the present invention, the trough 20 and bin 10 are adjustably connected together by a plurality of spacer members 30 which correspond to the number and circumferential spacing of the groups of slots 14. As best seen in FIG. 4, each spacer member 30 is formed from a single length of spring rod or wire which is bent to provide a pair of converging legs 31, the inner ends of which are joined by a V-shaped bill, the bill including a pair of converging arms 32, the inner ends of which are joined by a bight 33. The outer ends of the arms 32 are integrally joined to the ends of legs 31 at bends 36.

The outer ends of the legs 31 are provided with helical spring members 34, each of which includes approximately two revolutions of the wire, the spring members 34 terminating in short straight tangentially extending portions 37 to which are joined, outwardly extending latch fingers 35. When the spring members 34 are in their relaxed condition, fingers 35 extend generally parallel to the converging legs 31, however, the finger 35 may be rotated about the axis of the spring members 34, thereby tightening the spring members 34 until the plane of legs 31 is perpendicular to the fingers 35.

The plane of the arms 32 and the plane of arms 31 intersect each other at approximately right angles while the plane of the legs 31 is parallel to the axis of the spring members 34, the axis of the spring members 34 being disposed on a side of the plane of the legs of 31 opposite the side from which the arms 32 project. When the spring members 34 are tightened, fingers 35 project generally in the direction of projection of the arms 32 from the legs 31 and, thus, the tension of spring members 34 tends yieldably to urge the legs 31 toward the fingers 32.

Figure 2:
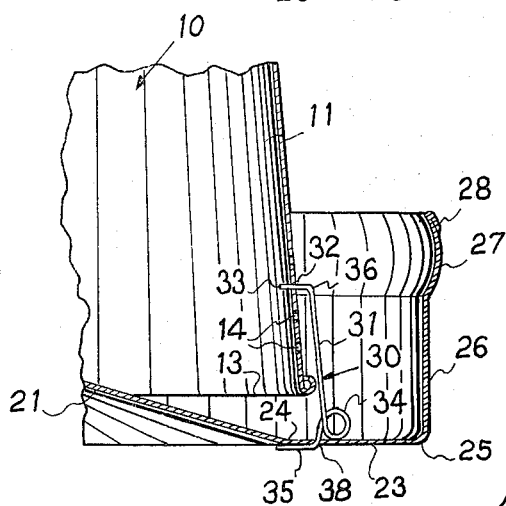
FIG. 2 is a fragmentary vertical sectional view of a portion of the feeder disclosed in FIG. 1.
Figure 3:
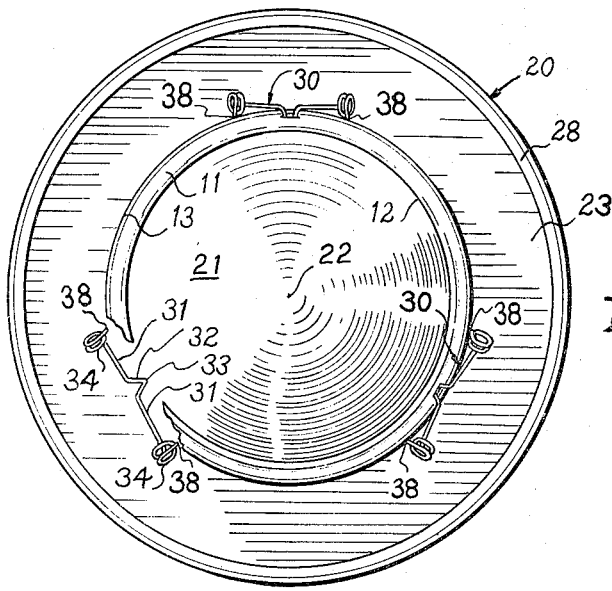
FIG. 3 is a partially broken away plan view of the feeder illustrated in FIG. 1, the bail of the feeder being deleted therefrom.

As best seen in FIG. 2, the outer bottom plate 23 is provided, adjacent to the common edge 24, with three pairs of holes 38 which are adapted to receive, therethrough, the fingers 35 of the spacer members 30, a pair of holes 38 being provided each 120° circumferentially around the common edge 24.

It will be understood that the holes 38 are radially spaced from the apex 22 by distances approximately equal to or slightly greater than the radius of bottom 13 of the bin 10. Therefore, the spacer members 30 may be removably installed on the upper surface of the bottom of trough 20 by inserting the fingers 35 through holes 38 so that the fingers 35 project inwardly and lie parallel to and below the bottom, i.e., the bottom plate 23, while the legs 31 extend generally in an upright position when the spring members 34 are tightened.

When bin 10 is positioned concentrically with trough 20, the spacer members 30 are positioned circumferentially about the lower end 13 of the bin 10 with their bills protruding inwardly. The bills are aligned radially with the groups of slots 14 so that each bill of a spacer member 30 may selectively project into any one of the slots 14 in an aligned group of slots 14.

When a spacer member 30 is cooperating with a group of slots 14, the legs 31 extend essentially upright, converging upwardly to terminate at the bill. The arms 32 of the bill converge inwardly, the maximum spacing between the converging arms 32 being greater than the widths of a slot 14, whereby, the bill i.e., the converging arms 32, are yieldably urged inwardly by spring members 34 until the arms 32 fill the slot 14.

By grasping the legs 31 of a spring member 30 and pulling them outwardly against spring tension, the bill of the spacer member may readily be removed from a slot 14. By manipulation of the space members 30, so as to locate the bills thereof in different slots 14, the distance between the lower end 13 of the bin 10 and the upper surface of the bottom of the trough 20 may be adjusted, thereby defining the height to which the granular feed material may spill from the bin 10 into the trough 20.

For suspending the bin 10 from overhead, a bail 40 is provided, the bail 40 having trunnions, such as trunnion 41, at its ends, the trunnions 41 being adapted to projection through a pair of diametrically opposed holes 42 in the upper end portion of the bin 10.

While the spacer members 30 are made from spring wire and therefore are yieldable, they are sufficiently rigid to support the bin 10 when the trough 20 is placed on the ground, thereby maintaining the proper spacing between lower end 13 of bin 10 and the bottom of the trough 20. Furthermore, spacer members 30 will support the trough 20 when the bin 10 is suspended by the bail 40 from an overhead support.

It will be obvious to those skilled in the art that many variations may be made in the embodiment here chosen for the purpose of illustrating the present invention without departing from the scope thereof as defined by the appended claims.

I claim:
1. In a feeder of the type having an upright open ended tubular frusto-conical bin and a cup shaped trough concentrically disposed therebeneath, said cup shaped trough including a bottom having a conical upwardly projecting central bottom portion and an annular flat bottom plate secured by its inner periphery to the outer periphery of said conical central bottom portion, and a wall projecting upwardly from the outer periphery of said annular bottom plate, the combination therewith of a plurality of circumferentially spaced spacer members connecting the lower portion of said bin to said trough, each spacer member being characterized by a single length of rod material defining a pair of converging legs disposed in a plane, a pair of converging arms extending from the converged ends of said legs and disposed in a plane approximately perpendicular to the plane of said legs, a bight joining the adjacent ends of said arms, helically wound spring members connected to the other ends of said legs on a side of the plane of said legs opposite the side on which said arms are located, and fingers projecting outwardly from said spring members, said fingers of said spacer members being received through apertures in said bottom of said trough, said legs of spacer members extending upwardly from said bottom of said trough, the lower portion of said bin being provided with circumferentially spaced groups of vertically spaced circumferentially elongated slots, the number and spacing of the groups of slots corresponding to the number and spacing of said spacer members, said arms of each of said spacer members forming a bill for selectively projecting into anyone of said slots in an associated group of slots.

2. In a feeder including a bin having an opening at the bottom and a plurality of groups of vertically spaced circumferentially elongate slots and a trough disposed below the opening at the bottom of the bin defining a plurality of finger receiving holes, the combination therewith of a plurality of spacer members each including a pair of substantially rigid legs, right angularly disposed arms, selectively receivable in said slots, joining the upper ends of said legs, coil springs formed at the lower ends of said legs, and fingers extending from said coil springs to be releasably engaged through said finger receiving holes.

References Cited by the Examiner

UNITED STATES PATENTS

| | | | |
|---|---|---|---|
| 852,585 | 5/07 | Terry | 292—87 |
| 853,860 | 5/07 | Bigelow | 292—80 |
| 1,114,482 | 10/14 | Johnson | 119—52 |
| 1,131,491 | 3/15 | Drake | 119—53 |
| 1,372,812 | 3/21 | Harmon | 292—87 X |
| 3,012,539 | 12/61 | Warren | 119—53 |

SAMUEL KOREN, *Primary Examiner.*

HUGH R. CHAMBLEE, ALDRICH F. MEDBERY,
*Examiners.*